United States Patent
Dziaba et al.

(10) Patent No.: US 8,032,420 B2
(45) Date of Patent: Oct. 4, 2011

(54) INTEGRATED ORDERING SYSTEM

(75) Inventors: Michele M. Dziaba, Mundelein, IL (US); William R. Croasmun, Glenview, IL (US); Susan P. Bodett, Grayslake, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 2626 days.

(21) Appl. No.: 10/123,544

(22) Filed: Apr. 16, 2002

(65) Prior Publication Data

US 2003/0195816 A1 Oct. 16, 2003

(51) Int. Cl.
*G06Q 30/00* (2006.01)

(52) U.S. Cl. .................... 705/26.1; 705/27.1

(58) Field of Classification Search .............. 705/26, 705/27

See application file for complete search history.

(56) References Cited

U.S. PATENT DOCUMENTS

| | | | |
|---|---|---|---|
| 5,710,887 A | 1/1998 | Chelliah et al. | |
| 5,771,778 A | 6/1998 | MacLean, IV | |
| 5,785,204 A | 7/1998 | Thompson et al. | |
| 5,895,454 A | 4/1999 | Harrington | |
| 5,897,622 A | 4/1999 | Blinn et al. | |
| 5,918,213 A | 6/1999 | Bernard et al. | |
| 6,026,376 A | 2/2000 | Kenney | |
| 6,058,373 A | 5/2000 | Blinn et al. | |
| 6,101,483 A | 8/2000 | Petrovich et al. | |
| 6,119,934 A * | 9/2000 | Kolls ......................... | 235/381 |
| 6,131,086 A | 10/2000 | Walker et al. | |
| 6,134,548 A | 10/2000 | Gottsman et al. | |
| 6,574,603 B1 * | 6/2003 | Dickson et al. ............... | 705/1 |
| 6,606,602 B1 * | 8/2003 | Kolls ........................ | 705/14 |
| 7,107,231 B1 * | 9/2006 | Hall et al. .................. | 705/26 |
| RE41,543 E | 8/2010 | Satchell, Jr. et al. | |
| 2001/0053998 A1 * | 12/2001 | Kohda et al. ................. | 705/14 |

FOREIGN PATENT DOCUMENTS

| | | |
|---|---|---|
| DE | 199 46 875 | 4/2001 |
| JP | 10320628 | 4/1998 |
| WO | WO 01/12041 | 2/2001 |
| WO | WO 01/23009 | 4/2001 |
| WO | WO 01/23010 | 4/2001 |
| WO | WO 01/69497 | 9/2001 |
| WO | WO 01/72346 | 10/2001 |

OTHER PUBLICATIONS e-Port1, USA technologies granted another patent for micro credit card acticated transactions, PR Newswire, Sep. 21, 2000.*
ePort2, eport internet device unveiled as the new furiure of vending, Prnewswire, Oct. 5, 2000.*
ePort3, "usa signs $2 million contract with IBM to complete network enhancements for USA technologies' eport™ e-commerce device", PRNewswire, Oct. 18, 2000.*

(Continued)

*Primary Examiner* — Mark Fadok

(74) *Attorney, Agent, or Firm* — Fitch, Even, Tabin & Flannery

(57) ABSTRACT

The invention provides a method and apparatus for allowing a user to sample and order a product using an interactive ordering system. The ordering system includes a vending station to allow a user to sample a quantity of the product, an ordering station in close proximity to the vending station to allow the user to purchase a related product, and a delivery station to delivery the purchased product to the user.

8 Claims, 5 Drawing Sheets

OTHER PUBLICATIONS eport4, "USA technologies signs first multi-million dollar vending contract for revolutionary e-port", PR Newswire, Dec. 20, 2000.* eport5, "USA technologies granted another patent for networking and controlling vending machines and general use computing devices", PR Newswire, Dec. 27, 2000.* eport6, "USA technologies broadens eport™ product line" PR Newswire, Jan. 4, 2001.* eport7, "Marconi online and USA technologies form strategic alliance to launch new era of intelegent vending", Business wire, Mar. 14, 2001.* eport8, (USA Technologies files 15 more patents to protect e-port internet appliance device; technology undergoing pilot testing—company gearing up for mass production, Business wire, Jun. 26, 2000.* eport9, Nicholson, Leslie, Vending the rules machines may bring dot-corn to the masses, Knight Ridder Tribune, denver post, 4,10,2000.* e-port10, USA technologies receives nearly $5 million in cash infusion, PR Newswire, Jun. 22, 1999.* eport11, Nicholson, Leslie, Vending idea is no nickol and dime plan, Knight Ridder News Service, The Pregonian, Jan. 3, 2000.*

Broadvision, "Broadvision and Siebel systems partner to deliver personalized customer interaction via the web", Businesswire, Nov. 15, 1999.*

Magic Box News Letter, Feb. 2000 (1 pg. color.).

www.TheCoffee.com, Sep. 25, 2001 (3 pgs.).

* cited by examiner

INTEGRATED ORDERING SYSTEM

FIELD OF THE INVENTION

The invention relates generally to an ordering system, and particularly to an ordering system for consumable products.

BACKGROUND OF THE INVENTION

Vending machines are frequently used to dispense beverages, such as sodas or coffee, and individually packaged servings of food, such as sandwiches or fruit.

Prior art efforts to increase the efficacy of vending machines in marketing products have generally focused on attracting potential customers to the machines through the use of advertising on the front and sides of the machine and placement of the machines in high traffic areas. Use of aromas in conjunction with vending machines is also known in the prior art.

For example, U.S. Pat. No. 5,771,778 discloses a vending machine that uses an aromator to draw customers toward its product. The machine of the '778 patent automatically emits an aroma when a physical proximity sensor detects a person. The '778 patent allows more than one aroma to be consecutively emitted. The emissions of the individual aromas are not based upon any user interaction other than proximity.

There is a continuing need for systems to enable vending machines to be used more effectively in marketing of consumable products.

SUMMARY OF THE INVENTION

The invention provides a method and apparatus enabling the purchase of consumable products. The ordering system includes a vending station, an ordering station, and a processing station coordinated to allow for purchase of a first product for immediate delivery, and purchase of a second product for later deliver. The second product may be the same as the first product, or may be a related product.

The vending station may be adapted to dispense a first quantity to the user for consumption by the user. Proximate the vending station is an ordering station adapted to allow the user to place an order for another product, which may be a related product, such as a second quantity of the same product that the consumer has just purchased from the vending station. The ordering station may work with a processing station that receives the order for the second product and arranges to send the second product to the user.

In a preferred aspect of the invention, the ordering station comprises a visual interface presenting a plurality of different images to the consumer to promote the product. At least one of the images may comprise the product that the consumer has just purchased from the vending machine. The visual interface may comprise a display screen positioned for viewing by the consumer.

The ordering station may also include an audio interface directing a plurality of different sounds toward the user. Each different sound may be selected to be associated with one or more of the plurality of different images presented on the visual interface. These sounds, which may include music, are selected to create an association with the product by the user to promote the product. Soothing music may be associated with a product having relaxing attributes, such as when the product comprises tea. Exotic music may associated with a product having exotic attributes, such as when the product comprises a spiced beverage.

The ordering station may also include an aromatic interface for releasing a plurality of different scents toward the user. Each different scent may be associated with one or more of the plurality of different images presented in the visual display or sounds produced by the audio interface. The different scents may create an association with a particular product by the user to promote the product. For example, a chocolate scent may be dispensed when a user has selected an image pertaining to chocolate, such as a chocolate candy or a chocolate beverage.

The ordering station may also include a method of obtaining payment from the user. The payment may be obtained by entry of data into the ordering station by the consumer. Payment data previously entered by the user may be recalled upon entry of a user name or other identification associated with payment data of the particular user. Similarly, product delivery data may be entered or submitted at the ordering station by the user or may be associated with a user name or user profile assigned to the particular user.

A processing station may also be provided for receiving the order from the ordering station and arranging for the delivery of the order to the consumer. The processing station may be remote from the vending and ordering stations.

An interface system between a user and a computer is preferably provided. The interface system includes a visual interface, an audio interface, an aromatic interface, and a tactile interface between the system and the user. The visual interface is configured to present a plurality of different images to the user. The audio interface directs a plurality of different sounds at the user. Each different sound may be associated with one or more of the plurality of different images presented on the visual interface. The aromatic interface releases a plurality of different scents at the user. Each of the different scents may be associated with one or more of the plurality of different images presented on the visual interface. The tactile interface allows the user to change the images presented on the visual interface. Upon the change of select images to other select images, the sound and/or scent created by the audio interface and aromatic interface, respectfully, are also changed.

A vending station may be included with the interface system to enable the user to purchase a first quantity of the product prior to ordering a related product such as a second quantity of the product. By providing the vending station proximate the visual, audio, aromatic, and tactile interfaces, a combined marketing and sales effort for the product may achieved. The marketing effort may include allowing the consumer to sample a product received from the vending station, and then using the visual interface to select and order more of the just sampled product.

In an embodiment of the invention, a method is provided for user interface with a computer. The method includes adopting a first image and a second image for display on the screen. The images may comprise products that the consumer desires to purchase. A first scent is associated with the first image, while a second scent is associated with the second image. Similarly a first sound may be associated with the first image, and the second sound may be associated with the second image. The consumer may use the tactile interface to selectively display either the first image or the second image. Upon display of the first image, the first scent and the first sound will be emitted for the perception by the user. Likewise, when the second image has been selected by the user, the second scent and the second sound will be emitted for perception by the user.

DETAILED DESCRIPTION OF THE DRAWINGS

The invention is preferably embodied in a method and apparatus for allowing a user to obtain a first product from a vending station for immediate consumption, and immediately thereafter order a related product. Preferred embodiments of the invention, wherein an interactive ordering system is provided for sampling and promoting purchase of a product that can be ordered, are disclosed below.

Figure 4:
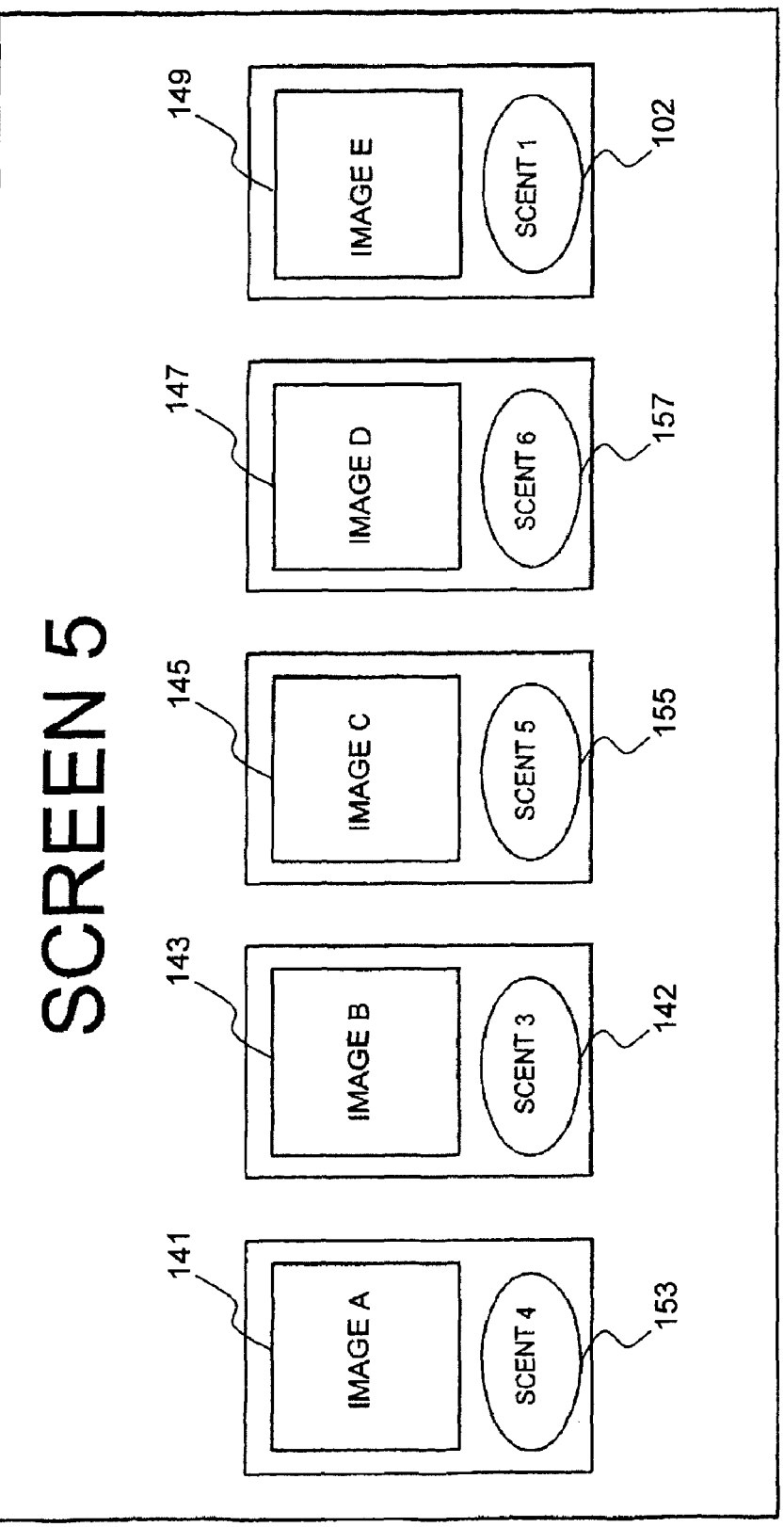
FIG. 4 illustrates another visual interface of the ordering station.
Figure 5:
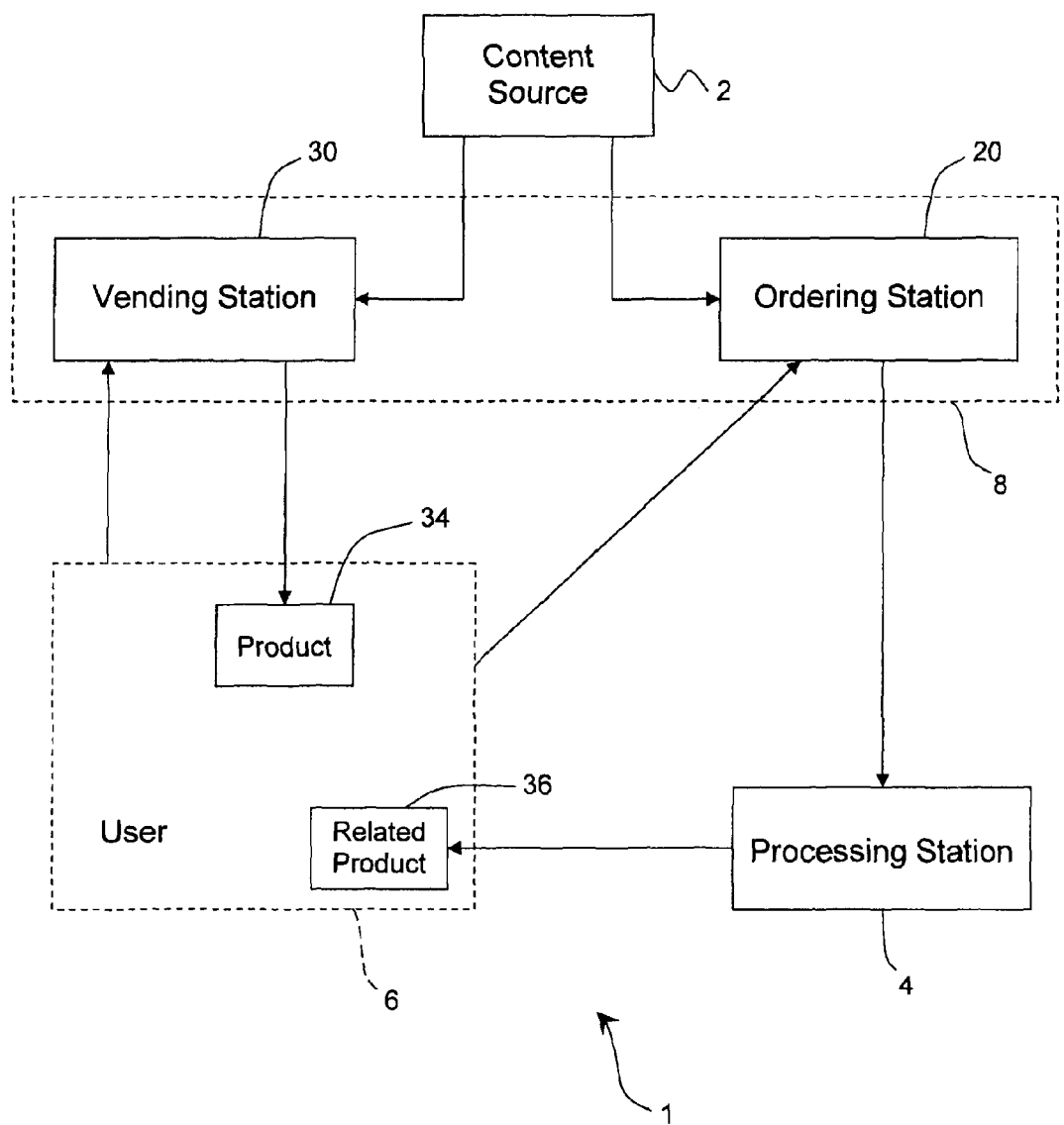
FIG. 5 illustrates interaction between components of the ordering system of FIG. 1.

FIGS. 1-5 illustrate apparatus and methods for allowing a user 6 to purchase a product 34 and order a related product 36, both having the same content source 2, in accordance with embodiments of the invention. As illustrated in FIG. 5, an interactive ordering system 1 allows a user 6 to purchase a product 34 from a vending station 30. The user 6 can order a related product 36 from an ordering station 20 proximately located by the vending station 30. A processing station 4 receives the order from the ordering station 20 and facilitates deliver of the related product 36 to the user 6.

The vending station 30 is configured to dispense one or more different types of the product 34 to a consumer. The vending station 30 may, for example, be configured to dispense a variety of different freshly brewed coffee varieties. Payment may be made directly at the vending station 30, or at a cashier removed from the vending station 30. The vending station 30 preferably dispenses freshly brewed single serving cups of coffee 34 of different sizes and/or different varieties to consumers.

Figure 1:
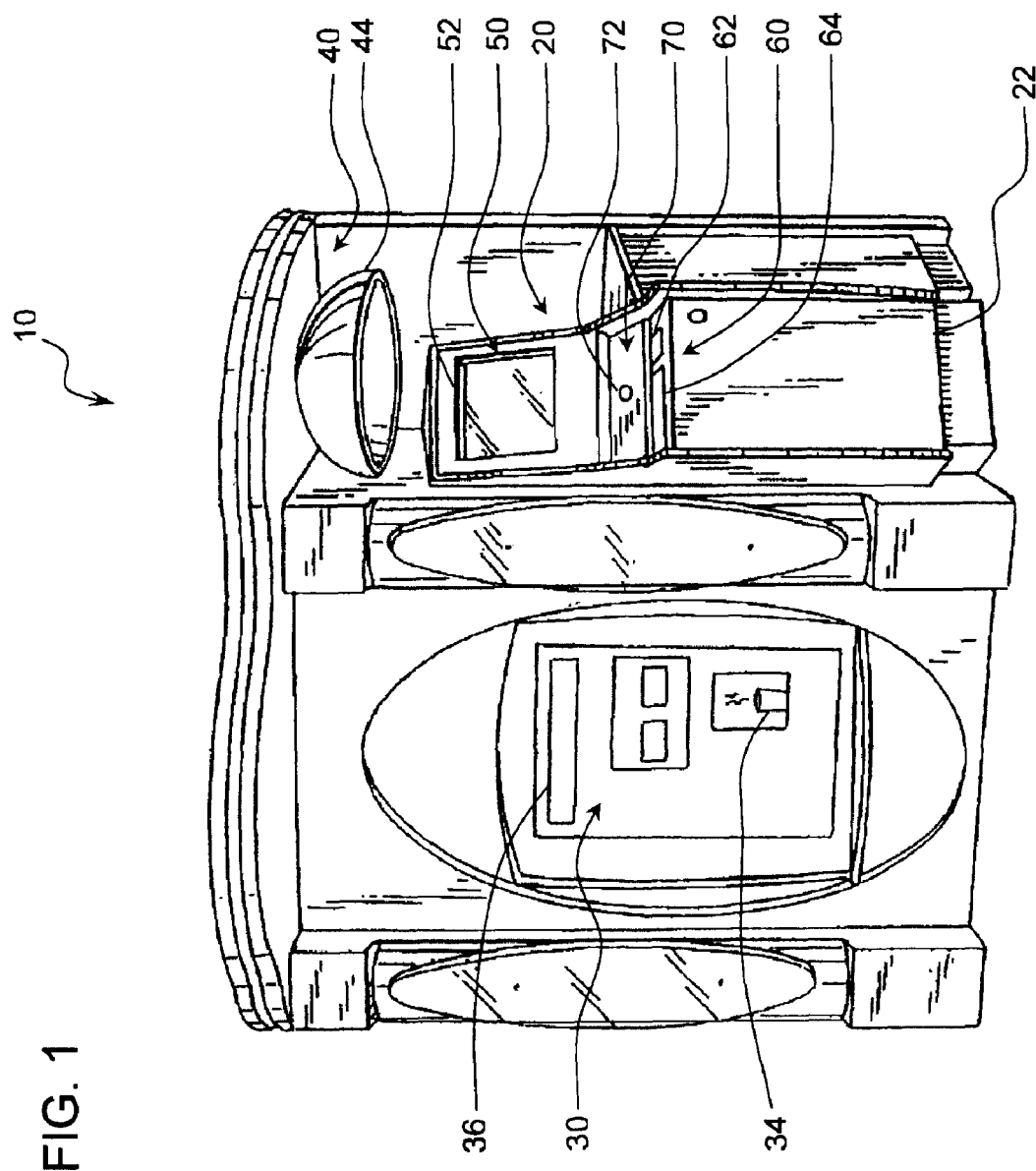
FIG. 1 illustrates an ordering system in accordance with an aspect of the invention.
Figure 2:
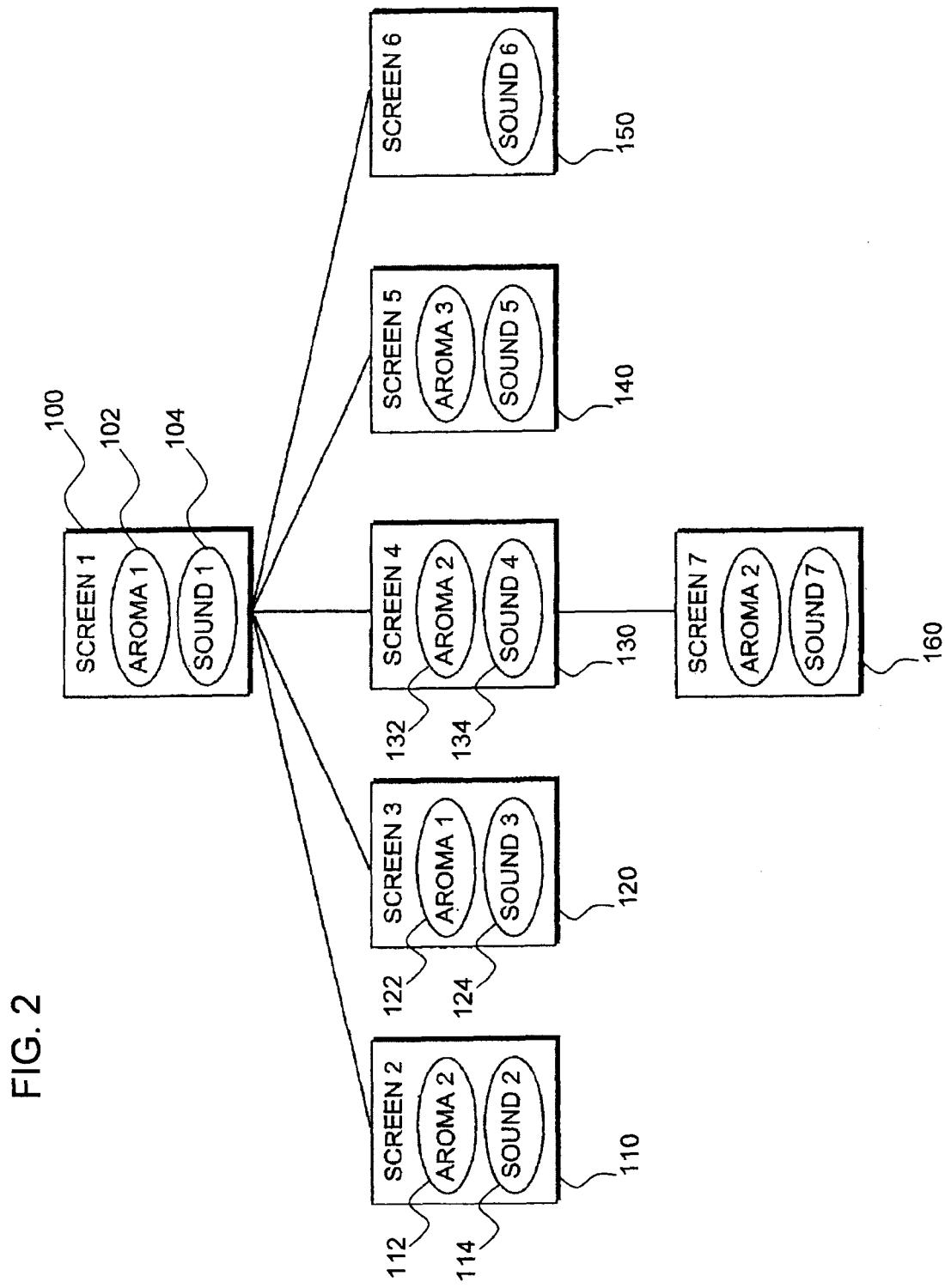
FIG. 2 illustrates an interactive interface for an ordering station of the ordering system.
Figure 3:
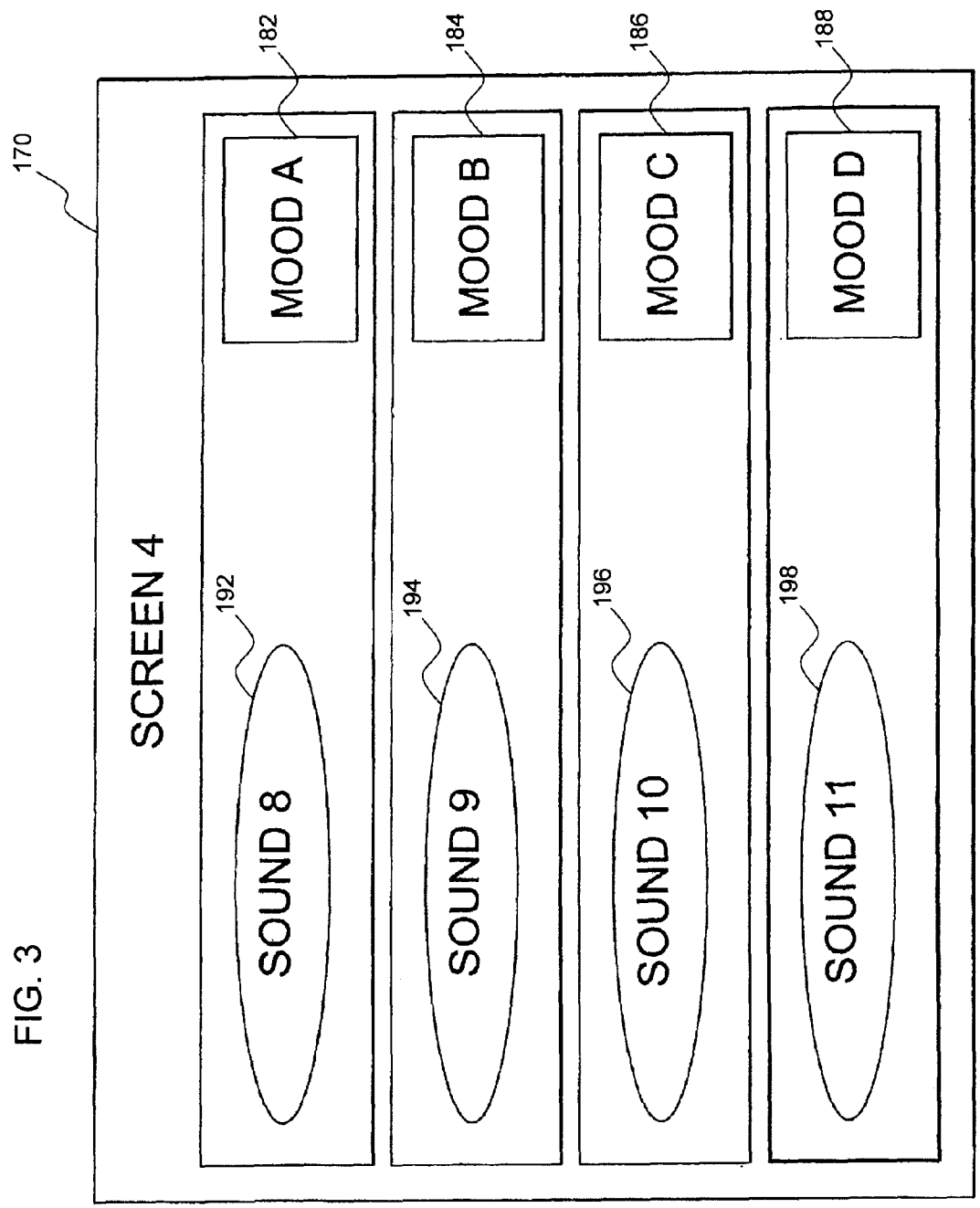
FIG. 3 illustrates the visual interface of the ordering station.

Proximate the vending station 30 is the ordering station 20, as illustrated in FIG. 1. The ordering station 20 and vending station 30 may be combined into one integrated unit, or may be physically separate but adjacent or in the same area 8, or even in different areas or rooms.

The ordering station 20 comprises a kiosk 22 which includes both a visual and a tactile interfaces 50 and 60 to allow for consumer interaction. The kiosk 22 includes a computer that may function as a dedicated ordering terminal, connected via Internet or Intranet to a website allowing consumers to order products. In a preferred embodiment of the invention, the user 6 may order a product that the user 6 has just purchased and/or sampled from the vending station 30.

In one particular embodiment of the invention, the product comprises coffee. The vending station 30 may dispense freshly brewed coffee 34, and a related product 36 such as coffee beans or freshly ground coffee of the same varieties or some of the varieties used in the vending machine 30 may be purchased from the ordering station 20. Other related products might include coffee cups or articles of clothing with a brand name, trademark, coffee theme, or logo.

In order to direct a user's attention from the vending station 30 to the ordering station 20, the vending station 30 may include a display 36 that directs the user's attention toward the kiosk 22 of the ordering station 20.

The display 36 may include a screen with a variety of images that are customized according to the product 34 that the consumer just purchased from the vending station 30. For example, if a consumer purchases a particular type of coffee from the vending station 30, the screen 36 may display a message indicating the price at which the consumer can order more of the coffee using the ordering station 20 for home delivery. The screen 36 may also advertise specials or discounts on the product 34 the user 6 has just purchased from the vending station 30, or may include similar products that the consumer may be interested in purchasing. For example, a purchaser of coffee may be shown an image on the screen 36 disclosing a coffee mug or coffee machine that may be purchased using the ordering station 20.

The ordering station 20, as illustrated in FIG. 1, includes the kiosk 22 having a visual interface 50, a tactile interface 60 for allowing user 6 interaction with the ordering station 20. The visual interface 50 may include a display screen 52, and the tactile interface 60 may include a keyboard 64 and/or a mouse 62. The visual and tactile interfaces 50 and 60 may be combined, such as in a touch sensitive screen.

The ordering station 20 may also include an audio interface 40 comprising a sound dome 44 for directing sound locally toward the user 6 positioned therebeneath, as illustrated in FIG. 1. The sound dome 44 is configured to allow the user 6 to fully hear the music generated by thereby, while separating the sound from the surrounding areas. In a preferred embodiment of the invention, the sound dome is manufactured by Brown Innovations, Inc., and is a Solosphere™ Virtual Audio Imager coupled with The Virtuoso™ amplifier/equalizer.

The kiosk 22 may also include an aromatic interface 70 comprising an aromatic scent dispenser 72 for releasing scents at the user 6. The scent dispenser 72 may be disposed in the sound dome in order to locally direct the scent at the user 6. The scent dispenser 72 may also be located as part of the kiosk 22. The scent dispenser may be of a type sold by Aerome GmbH Scent System Engineering, of Düsseldorf, Germany. The scent dispenser is capable of dispensing the following six different scents, each contained in a replaceable cartridge:

| Cartridge | Scent |
|---|---|
| Scent A | Hazelnut Coffee |
| Scent B | Coffee |
| Scent C | Chocolate |
| Scent D | Tea |
| Scent E | Orange |
| Scent F | Festive |

As discussed above, the vending station 30 may include a screen 36 that directs the user's attention toward the kiosk 22 of the ordering station 20. The kiosk 22 may also include a variety of different images displayed on the screen 52 for attracting the user 6 thereto. The images may display products that are available for purchase using the ordering station 20 and may also show products available from the vending machine 30. The images may be configured into an attract loop that changes the images displayed at predetermined time intervals. The images may include food, beverages, such as coffee, and other products available for purchase, such as coffee machines and coffee cups.

Once attracted to the kiosk 22 of the ordering station 20, such as by the screen 52 at the vending station 30 and/or the attract loop displayed on the screen 52 at the kiosk 22, users 6 are able to purchase products for delivery. In order to promote the products using the ordering station 20, the kiosk 22 includes interactive images, scents, and sounds all configured to enhance the purchasing and sale experience for the user 6.

Once the user 6 uses the tactile interface 60 to initiate an ordering sequence and stop the display attract loop images, a welcome page 100 is presented on the screen 52. Coinciding with the presentation of the welcome page 100, a first scent 102 and a first sound 104 are released and directed at the user 6 using the sound dome 44 and the aroma emitter 72. In an embodiment of the invention, the first scent 102 released approximates hazelnut coffee. The first sound 104, directed at the user 6, may comprise a clip of jazz music. The jazz music may be selected to match commercials or other music previously associated with the brand of product being sold through the kiosk 22. For instance, the first sound 104 may be a clip of jazz music that the user 6 has previously heard in a commercial for the coffee.

The welcome page 100 has a variety of links that the user 6 can select to direct the user 6 to a variety of different pages 110, 120, 130, 140, and 150. For example, the welcome page may have selections for directing users 6 to pages for direct delivery of products 110, single orders of product 120, learning more about products 130, gifts and other accessories 140, and user 6 feedback 150.

The direct delivery page 110 may be configured to allow users 6 who have previously registered with the ordering system 10 for delivery to quickly make selections of product for delivery. The direct delivery page 110 is suitable for frequent purchaser of products via the ordering system 10. By registering, such as at the ordering station 20 or a location other than the system 10, a consumer can store information in order to quickly recall the information to conveniently purchase products without having to repeatedly reenter the information. For example, a consumer can enter the delivery and payment information and then recall that information at the ordering station 20 without having to reenter the information each time they wish to make a purchase.

When a user 6 selects the direct delivery page 110 from the welcome page 100, in addition to displaying images for ordering product, a second sound 114 and a second scent 112 may be directed at the user 6. The second scent 112 may comprise a coffee aroma. The second sound 114 may comprise a jazz selection having a subtle Latin rhythm and/or Latin-American or Colombian theme that a user 6 may associate with coffee. The combination of the coffee aroma 112 and the Latin inspired jazz sounds 114 are selected to associate with the user 6 the coffee products that may be purchased using the ordering station 20.

Once a user 6 has entered the direct delivery page 110 and the second scent and sound 112 and 114 have been released, the purchaser may enter a user 6 name or other identifying information in order to make selections for ordering products. The user 6 identification enables the rapid purchase of a product without having to repeatedly enter delivery and payment data, thereby increasing the convenience of purchasing product for frequent consumers.

Different ways of entering information into the ordering station are contemplated. For example, a credit card, smart card, or other card can have data contained therein extracted by the ordering station. Infrared or other electronic transmission of data from a remote source, such as a hand-held computer, personal digital assistant, cellular phone or other device, is also contemplated.

A single order page 120 may also be selected from the welcome page 100. Upon selection of the single order page 120, users 6 may place orders for products without having to have previously registered, such necessary with the direct delivery page 110. When placing an order via the single order page 120, the consumer is directed to screens that require entry of payment and delivery data, which can be entered with the keyboard and mouse 64 and 62. However, other ways of entering information into the ordering station are contemplated by the invention. For example, entry of information may be accomplished remotely, such as by a hand-held transmitting device.

The single ordering page 120 includes a plurality of images corresponding to different products that the user 6 may purchase or links to pages through which the user 6 may purchase the products. When the user 6 selects the single order page 120 from the welcome page, a third scent 122 and a third sound 124 are emitted from the aroma emitter 72 and sound dome 44, respectively. The third scent 122 may be the same as the first scent 102, comprising hazelnut coffee aroma. The third sound 124 may be a clip of classical music, such as may be played in a European coffee house.

The ordering pages 110 and 120 communicate with the delivery or processing station 4, which is remote from the ordering station 20. The delivery station 4 receives the order, the payment data, and the delivery data. The delivery station 4 then generates an order to deliver the purchased product 36 to the consumer 6. The product 36 may be delivered to the consumer's home via mail or courier service. The delivery may be made in person, such as at a workplace. The delivery may comprise placing the ordered product 36 in a convenient location for the consumer 6 to pick up the product 36. For example, the purchased product 36 can be delivered to the location of the ordering station 20 to allow the user 6 to obtain the purchased product 36 upon return to the ordering station 20.

The welcome page 100 may also include a link to a learning page 130 at which users 6 may learn more about the product being sold through the ordering system 10. The learning page 130 is configured to increase brand awareness and association therewith on the part of the consumer. Upon selecting the learning page 130, a fourth scent 130 and a fourth sound 134 may be directed at the user 6. The fourth scent 134 may be the same as the second scent 112, comprising a coffee aroma. The fourth sound 134 may comprise a jazz selection, and may be matched to a commercial the consumer may associate with the product, similar to the jazz clip 104 of the welcome page 100.

From the learning page 134, the users 6 are directed to a page containing information about the various products available. For example, information about coffee roasts, flavored coffees, limited edition coffees, varietal coffees, and European coffees, may be available.

In addition, the learning page 130 may include an interactive product finder 170 for assisting users 6 in selecting a product from those available for ordering via the ordering station 20. The product finder 170 may include several prompts 182, 184, 186, and 188 that correspond with the mood or desired mood of the user 6. For example, the moods may include descriptions such as "a bold, aromatic wake-up," "a smooth, relaxing escape," "flavorful indulgence," and "a complex, exotic getaway."

Upon selecting a mood prompt 182, 184, 186, or 188, the sound dome 44 will emit a sound corresponding to the mood selected by the user 6. Selection of the "bold" mood 182 causes an eighth sound 192 comprising a jazz audio clip to be directed at the user 6. When a user 6 selects the "smooth" mood 184 a ninth sound 194 comprising a smooth jazz clip will be emitted from the sound dome 44 and directed at the user 6. When the "flavorful" mood 186 is selected by a user 6, a tenth sound 196 comprising light classical music is emitted by the sound dome 44. Selection of the "complex" mood 188 by the user 6 will cause an eleventh sound 198 comprising exotic sounding jazz to be directed by the sound dome 44 at the user 6.

The mood selector 170 and associated sounds 192, 194, 196, and 198 are configured to associate in the users 6 mind a particular product, such as coffee, with the sounds and mood selected by the user 6. An image of one or more of the products available for sale through the ordering station 20 and associated with the selected mood 182, 184, 186, or 188 will be presented to the user 6. Once directed to the choice or choices of product available, the user 6 may select from the products for later delivery and purchasing.

The learning page 130 may also include a link to a page 160 for learning more about coffee. The coffee information page 160 may include information about the history and origin of the product, the product market, and steps used in the manufacturing of the products that the consumer may purchase. Once the coffee information page 160 has been selected from the learning page 130, a seventh sound 164 and seventh aroma 162 may be emitted. The seventh sound 164 may comprise a subtle African rhythm to relate to African coffee images that may be displayed. The seventh scent 162 may comprise a coffee aroma, similar to the fourth and second scents 132 and 112.

From the welcome page 100, users 6 may also be directed to a page 140 for purchasing additional products, such as gifts and accessories. Upon selecting this page 140 a fifth sound 144 and a fifth scent 142 may be directed at the user 6 via the sound dome 44 and aroma emitter 72. The fifth scent 142 may include a chocolate aroma, particularly if chocolate or chocolate containing products are being sold via the page 140. The fifth sound 144 may comprise a jazz or classical selection.

Within the purchasing page 140 a variety of different images 141, 143, 145, 147, and 149 of products may be presented, as illustrated in FIG. 4. Upon selection of a certain image 141, 143, 145, 147, or 149, a corresponding scent 153, 142, 155, 157, or 102 may be released to appeal to the consumer. For example, the image A 141 may comprise a tea product, and selection thereof will cause the aroma emitter 72 to release a tea scent 153. Similarly, the image B 143 may illustrate chocolate products available for purchase. Selecting image B 143 will cause emission of a chocolate scent 142. Image C 145, image D 147, and image E 149 may be associated with an orange aroma 155, a festive or spicy aroma 157, and a hazelnut coffee aroma 102, respectively.

A newsletter or feedback page 150 may also be selected by the user 6 from the welcome page 100. Upon selecting the feedback page 150 a sixth sound 154 may be directed at the user 6 via the sound dome 44. The sixth sound 154 may include a jazz or classical clip. The feedback page includes a comment submission interface allowing users 6 to easily provide comments.

The pages 100, 110, 120, 130, 140, 150, and 160 viewable at the screen 52 of the kiosk 22 may be linked to pages accessible through the world wide web at locations other than the ordering station 20. However, the pages at the ordering system 10, may, in addition to the typical content from the world wide web pages, include frames customized for the ordering system 10 in order to create a unique experience for the consumer.

From the foregoing, it will be appreciated that the invention provides a method and apparatus for allowing a user 6 to sample and order a product using an interactive ordering system 10. The invention is not limited to the embodiments described hereinabove or to any particular embodiments. Various modifications to the aforementioned specific embodiments will result in substantially the same invention.

The invention is defined more particularly by the following claims:

The invention claimed is:

1. An ordering system enabling purchase of consumable products by a user, the system comprising:
a vending station configured to dispense a first product to the user for consumption by the user;
an ordering station adjacent to the vending station configured to allow the user to place an order for the purchase and later delivery of a related product; and
a processing station configured to receive the order from the ordering station and send the related product to the user, and wherein the ordering station comprises an audio interface directing a plurality of different sounds to the user, each different sound being associated with one or more of a plurality of different images and being effective to create an association with at least one of the products by the user.

2. The ordering system of claim 1, wherein the first product comprises brewed coffee and the related product comprises unbrewed coffee.

3. The ordering system of claim 1, wherein the ordering station is a dedicated ordering terminal continuously displaying advertising information when not in use, and wherein the ordering station comprises a visual interface presenting a plurality of different images to the user, at least one of the images showing the product.

4. The ordering system of claim 3, wherein the ordering station comprises an aromatic interface releasing a plurality of different scents, each different scent being associated with one or more of the plurality of different images and being effective to create an association with the product by the user.

5. The ordering system of claim 1, wherein the order comprises payment data and delivery data.

6. An ordering system in accordance with claim 1 wherein the ordering station allows the user to place an order for the purchase and later delivery of the related product to a location selected by the user from a plurality of different locations.

7. An ordering system in accordance with claim 1, wherein the related product is consumable.

8. The ordering system of claim 1, wherein the vending station is configured to communicate information regarding the first product to the ordering station and the ordering station is configured to prompt the user to place an order for one of a plurality of related products dependent upon the first product.

* * * * *